(12) United States Patent
Erbes et al.

(10) Patent No.: US 8,474,140 B2
(45) Date of Patent: Jul. 2, 2013

(54) HIGH PRECISION GRINDING AND REMANUFACTURING OF MACHINE COMPONENTS

(75) Inventors: Francis E. Erbes, Laredo, TX (US); Michael Grier, Selmer, TN (US); Gary Harris, Anniston, AL (US); Randall H. Bishop, Munford, AL (US)

(73) Assignee: Caterpillar Inc., Peoria, IL (US)

( * ) Notice: Subject to any disclaimer, the term of this patent is extended or adjusted under 35 U.S.C. 154(b) by 1418 days.

(21) Appl. No.: 12/150,547

(22) Filed: Apr. 29, 2008

(65) Prior Publication Data
US 2009/0265907 A1  Oct. 29, 2009

(51) Int. Cl.
*B23P 6/00* (2006.01)

(52) U.S. Cl.
USPC ............ 29/890.121; 29/890.128; 29/890.132; 29/402.06

(58) Field of Classification Search
USPC ......... 29/890.121, 890.12, 890.126, 890.128, 29/890.132, 402.06, 557; 137/15.08, 15.01, 137/315.03; 451/28
See application file for complete search history.

(56) References Cited

U.S. PATENT DOCUMENTS

| | | | |
|---|---|---|---|
| 1,421,133 A | 6/1922 | Albertson | |
| 1,875,486 A | 9/1932 | Peaslee | |
| 3,873,107 A * | 3/1975 | Hohwart et al. | 279/139 |
| 3,945,652 A * | 3/1976 | Hohwart et al. | 279/139 |
| 4,615,149 A * | 10/1986 | Yoneda et al. | 451/5 |
| 4,648,025 A * | 3/1987 | Yoneda et al. | 700/164 |
| 4,709,509 A * | 12/1987 | Yoneda et al. | 451/5 |
| 4,711,054 A * | 12/1987 | Tsujiuchi et al. | 451/5 |
| 4,934,106 A * | 6/1990 | Setzer | 451/9 |
| 5,070,653 A | 12/1991 | Amundsen | |
| 5,199,222 A | 4/1993 | Leroux et al. | |
| 5,337,521 A | 8/1994 | Heyl et al. | |
| 5,439,412 A | 8/1995 | Bishop | |
| 5,527,210 A | 6/1996 | Sharer | |
| 5,674,111 A | 10/1997 | Harada et al. | |
| 5,697,342 A | 12/1997 | Anderson et al. | |
| 5,893,793 A | 4/1999 | Nishio et al. | |
| 6,450,865 B2 * | 9/2002 | Mulroy et al. | 451/49 |
| 7,861,738 B2 * | 1/2011 | Erbes | 137/15.08 |

* cited by examiner

*Primary Examiner* — David Bryant
*Assistant Examiner* — Ryan J Walters
(74) *Attorney, Agent, or Firm* — Jonathan Yates; Liell & McNeil

(57) ABSTRACT

Grinding a machine component such as a valve component during remanufacturing, includes seating one end of the valve component in a chuck of the grinding apparatus, then contacting a steady rest with a reference surface on an outer diameter of the valve component while rotating the valve component, and then reseating the one end of the valve component in the chuck. A first valve surface on an outer diameter of the valve component is ground while contacting the steady rest with the reference surface, then a second, different valve surface on the outer diameter of the valve component is ground also while contacting the steady rest with the reference surface. The valve component is then reassembled with a hydraulically actuated device for service therein.

12 Claims, 3 Drawing Sheets

HIGH PRECISION GRINDING AND REMANUFACTURING OF MACHINE COMPONENTS

TECHNICAL FIELD

The present disclosure relates generally to the field of machining, and relates more particularly to a high precision grinding strategy applicable to remanufacturing machine components.

BACKGROUND

Many machining operations are directed to removing material from a workpiece in a controlled manner. "High precision" machining generally refers to techniques for cutting, grinding, and other forms of workpiece modification where tolerances can be relatively tightly controlled. Many parts used in modern machine systems need to have a relatively exact size, configuration, alignment of features or factors such as surface finish to function properly in a service environment. Engineers have long sought machining methods with improved precision for manufacturing new parts. In recent years, increasing attention has been paid to the use of high precision machining techniques in the growing field of remanufacturing.

Remanufacturing of machine components has provided new opportunities for revenue and resource conservation. New techniques enabling the reuse of previously scrapped parts have also been developed. A common technique for remanufacturing machine components such as hydraulic valve parts involves removing wear and/or repairing damage to the parts, often by grinding. It is generally desirable to return the parts to specifications as close to the original specifications as practicable. Many hydraulic valve parts, notably those used in fuel injection systems, are originally machined at relatively tight tolerances. Valve members, for example, may be required to actuate quite rapidly and precisely many times during a service life. To enable salvaged valve members to operate similarly when returned to service, tolerances in remanufacturing often need to be at least as tight as tolerances in original manufacturing. An added incentive to tightly controlling tolerances in remanufacturing is the possibility of returning parts to service with the same or identical components to those with which they were previously used.

U.S. Pat. No. 5,893,793 to Nishio et al. ("Nishio") is directed to machining an elongated cylindrical article of ceramic material. In Nishio, an article to be machined such as an engine valve is chucked at opposite longitudinal end portions of the article, then driven by one of the chucks at one end while allowing slip in the chuck at the other end. Positional deviation between a center axis passing between the chucks and an axis of the article is purportedly removed by a self-aligning centrifugal action of the article. The article is then securely chucked, and machined with a machining tool. The strategy is stated to improve grinding accuracy. Nishio states that at least one of the chuck heads is made of a material softer than a ceramic material of the workpiece. This enables the workpiece to wear the slipping chuck head to remove any positional deviation between the axes. While Nishio appears to improve grinding accuracy for certain articles, other components are not amenable to machining with Nishio's highly specialized techniques.

SUMMARY

In one aspect, a method of remanufacturing an elongate valve component of a hydraulically actuated device includes receiving an elongate valve component removed from service in a hydraulically actuated device, and setting up a grinding apparatus for regrinding the valve component. Setting up the grinding apparatus includes seating one end of the valve component in a chuck of the grinding apparatus, then contacting a steady rest of the grinding apparatus with the valve component while rotating the valve component in the chuck, and then reseating the one end of the valve component in the chuck. The method further includes, subsequent to setting up the grinding apparatus for regrinding the valve component, regrinding a first surface of the valve component and then regrinding a second surface of the valve component, while contacting the steady rest therewith.

In another aspect, a hydraulically actuated device is remanufactured according to a process which includes receiving an elongate valve component removed from service in a hydraulically actuated device. The process further includes setting up a grinding apparatus for regrinding the valve component, including seating one end of the valve component in a chuck of the grinding apparatus, then contacting a steady rest of the grinding apparatus with the valve component while rotating the valve component in the chuck, and then reseating the one end of the valve component in the chuck. The process further includes, subsequent to setting up the grinding apparatus for regrinding the valve component, regrinding a first surface of the valve component and then regrinding a second surface of the valve component, while contacting the steady rest therewith. The process still further includes reassembling the valve component with a hydraulically actuated device for service therein.

In still another aspect, a process for grinding elongate machine components includes engaging a chuck of a grinding apparatus with an elongate machine component, including seating one end of the machine component in the chuck, and contacting a steady rest of the grinding apparatus with the machine component, the machine component defining a first axis and the grinding apparatus defining a second axis. The process further includes grinding a first surface on an outer diameter of the machine component and grinding a second surface on the outer diameter of the machine component while contacting the steady rest therewith. The process still further includes, prior to grinding the first and second surfaces, establishing congruity between the first axis and the second axis by rotating the machine component while contacted with the steady rest, then reseating the one end of the machine component in the chuck.

DETAILED DESCRIPTION

Figure 1:
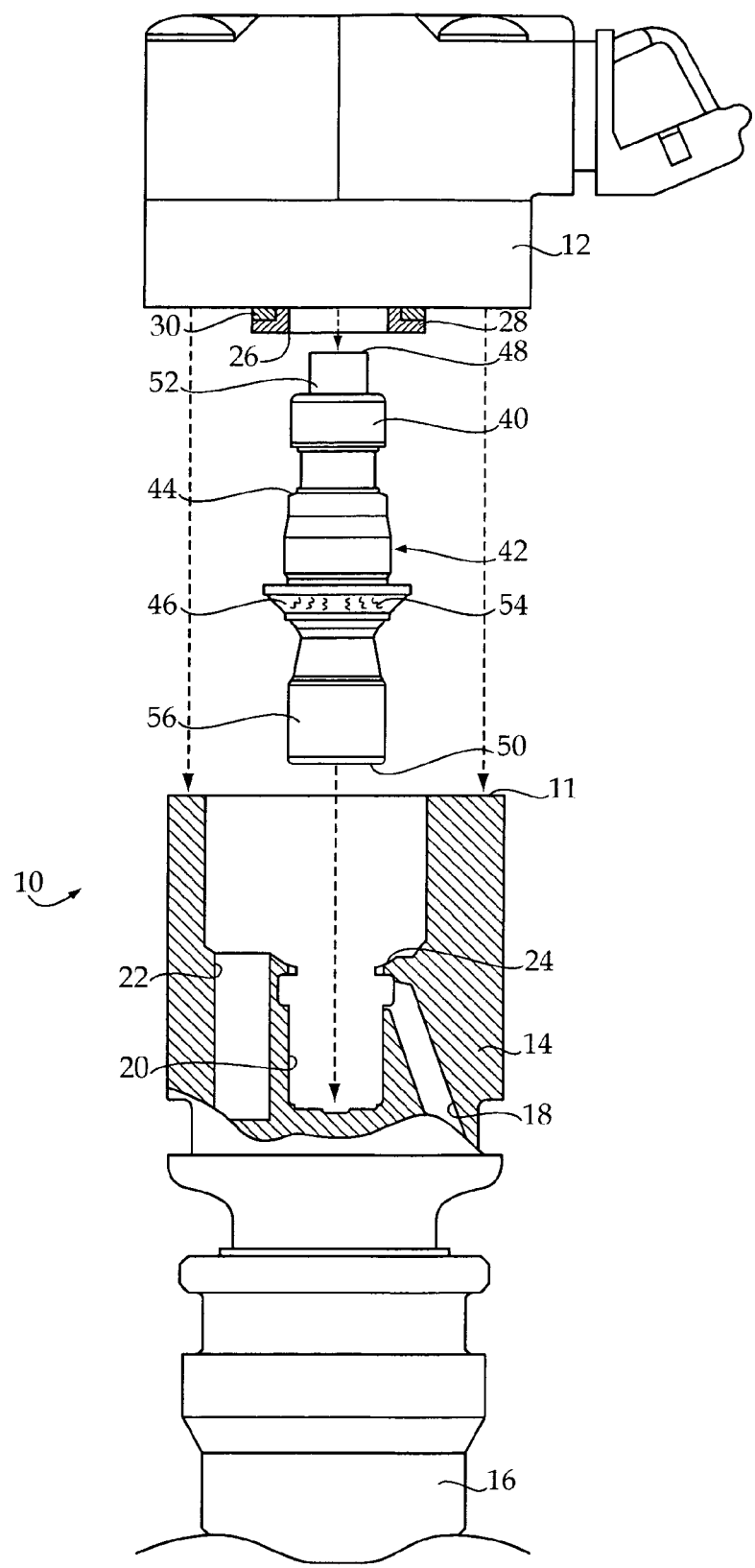
FIG. 1 is a partially sectioned side view of a fuel injector partially disassembled for remanufacturing, according to one embodiment.

Referring to FIG. 1, there is shown a fuel injector 10 which has been partially disassembled for remanufacturing. Injector 10 may include a plurality of body components, including a first body component 12, a second body component 14 and a third body component 16 coupled with second body component 14. Body component 12 may comprise an actuator subassembly configured to couple with body component 14. Body component 14 may comprise a valve body having a timing face 11 configured to mate with actuator subassembly 12. A valve member 40 may be positionable at least partially within body component 14 and configured to move between a first position at which it contacts a lower valve seat 24 located in body component 14 and a second position at which it does not contact lower valve seat 24, and contacts an upper valve seat 26. In one embodiment, upper seat 26 may be located on an insert 28 which is coupled with actuator subassembly 12 and configured to extend partially into body component 14 when body component 12 is coupled with body component 14. A spacer 30 may be positioned between insert 28 and body component 12. Valve member 40 may be guided as it moves between its first and second positions by interacting with a guide bore 20 located in body component 14. Alternately blocking and unblocking valve seat 24 can control fluid communications between a passage 18 in body component 14 and a second passage 22 also in body component 14 to control fluid flow or pressure to other parts of fuel injector 10 in a conventional manner.

Valve member 40, as well as other components of injector 10 may be salvaged for remanufacturing. Accordingly, disassembly of injector 10 approximately as shown in FIG. 1 may represent a first remanufacturing stage, at which components of injector 10 are disassembled, cleaned, inspected for damage, etc., then prepared for subsequent processing prior to returning to service. The present disclosure includes concepts for remanufacturing which may be implemented in the context of fuel injectors. It should be appreciated, however, that the present disclosure is not limited in application to any particular type of machine component nor even to hydraulically actuated machine components, except as otherwise indicated herein.

Valve member 40 represents one class of elongate machine components which are amenable to remanufacturing according to the present disclosure. Valve member 40 may include a first end 48, a second end 50 and an outer diameter 42. Valve member 40 may further include a first seating surface 44 which is configured to contact upper seat 26, and a second seating surface 46 which is configured to contact lower seat 24. Seating surface 46 may comprise a conical seating surface in one embodiment. Seating surface 44 may comprise an annular seating surface, and may further comprise a substantially planar edge of valve member 40. Seating surfaces 44 and 46 may face away from each other and are spaced apart at first and second longitudinal locations of valve member 40. In other embodiments, valve member 40 might have seating surfaces with different configurations than those illustrated herein. A first end portion 52 of valve member 40 adjoins first end 48, and a second end portion 56 adjoins second end 50. End portions 52 and 56 may be cylindrical. End portion 56 may comprise a guide element configured to slidingly interact with an inner diameter surface of body component 14 which defines bore 20 for guiding valve member 40. Stated another way, the portion of outer diameter 42 on end portion 56 may comprise a guide surface for valve member 40. End portion 52 may be coupled with an electrical actuator or associated components (not shown) located in body component 12 in a conventional manner.

One or more example wear regions 54 are evident on seating surface 46 in FIG. 1. During operation of fuel injector 10, valve member 40 may move relatively rapidly between its first and second positions. Seating surfaces 44 and 46 will tend to impact seats 26 and 24, respectively. Wear regions 54 can result from the impacts, and potentially from other factors such as fluid cavitation and erosion, depending upon the service environment of valve member 40. Different valve types may experience different types and degrees of wear. Each of seating surfaces 44 and 46 may be understood as "functional" surfaces, meaning that the subject surfaces 44, 46 physically interact with a different component of fuel injector 10 during operation, such as by contacting a different component. The portion of outer diameter 42 located on end portion 52 and comprising a guide surface might also be understood as a functional surface, as it interacts with bore 20 for guiding valve member 40. Portions of outer diameter 42 which do not physically interact with other components of fuel injector 10 might be considered "non-functional." One practical implementation of the present disclosure is considered to be grinding or regrinding of functional surfaces on valve members such as poppet valve members to remove wear such as example wear regions 54 of valve member 40. It should be appreciated that elongate machine components other than valve members, and having functional surfaces other than those described herein, may be remanufactured according to the present disclosure. A movable machine component such as a rod or shaft having surfaces which contact stops, as opposed to seats, would be one such example. Moreover, while remanufacturing is considered to be one practical implementation of the present disclosure, it might also be applied in the manufacturing of new components.

Figure 2:
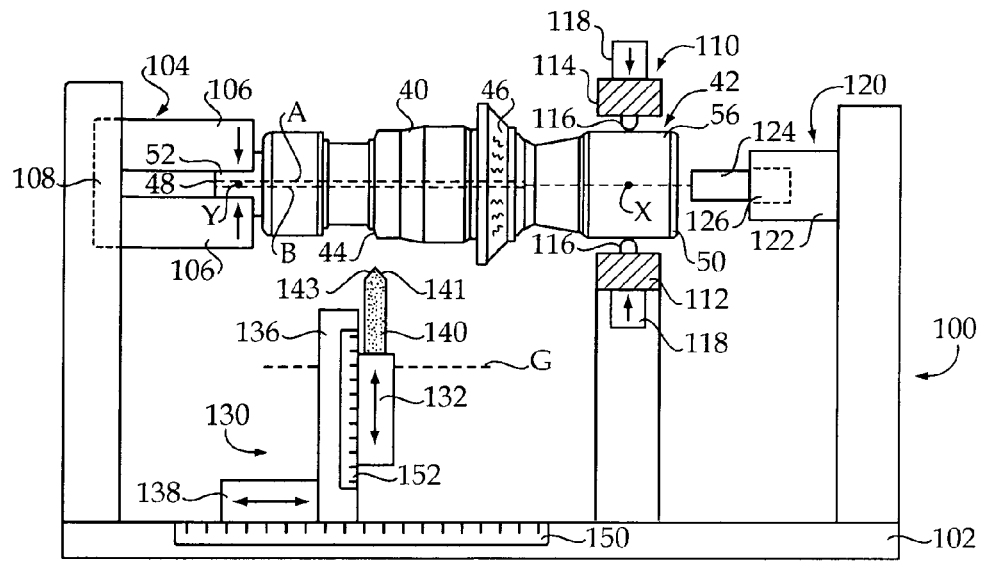
FIG. 2 is a side diagrammatic view of a machine component positioned in a grinding apparatus at a remanufacturing stage, according to one embodiment.

Turning now to FIG. 2, there is shown valve member 40 at one stage of remanufacturing after disassembly from fuel injector 10 and mounted in a grinding apparatus 100. Grinding apparatus 100 may include a base 102 having a chuck 104 mounted thereon. Chuck 104 may be configured to support valve member 40 for grinding surfaces 44 and 46, and may include a set of chuck jaws 106 and an actuator 108 coupled with chuck jaws 106. It should be appreciated that the term "grinding" as used herein includes "regrinding," as regrinding is one type of grinding. Thus, chuck 104 is also configured to support valve member 40 for regrinding. Actuator 108 may be configured to clamp chuck jaws 106 about end portion 52 of valve member 40. Chuck 104 may further be configured to rotate valve member 40, as further described herein.

Grinding apparatus 100 may also include a steady rest 110 which is also configured to support valve member 40 for grinding surfaces 44 and 46. Steady rest 110 may include one or more housing portions 112 and 114 having a plurality of rolling elements 116 such as ball bearings mounted therein. Rolling elements 116 may be positioned against outer diameter 42 of valve member 40, and in one embodiment may be contacted with end portion 56. Steady rest 110 may further include at least one actuator 118 which is configured to bring rolling elements 116 into contact with end portion 56 for rotatably supporting valve member 40 for processing with grinding apparatus 100.

Grinding apparatus 100 may further include a pusher 120 having a base 122, a contact element such as a rod 124 and an actuator 126. In one embodiment, actuator 126 is configured to move rod 124 relative to base 122 to contact rod 124 with end 50 of valve member 40. Contacting rod 124 with end 50 of valve member 40 can apply a force to valve member 40 in a direction aligned with a longitudinal axis A defined by valve member 40, the significance of which will be apparent from the following description.

Grinding apparatus 100 may still further include a grinder 130 coupled with base 102, and having a housing 136 coupled with a rotatable grinding element 140. Grinding element 140 may define a grinding axis G, a first grinding face 141 and a second grinding face 143 opposite first grinding face 141. Grinding apparatus 130 may further include a first actuator 138 and a second actuator 132. In one embodiment, first actuator 138 is configured to control a position of grinder 130 relative to a first reference element 150, whereas second actuator 132 is configured to control a position of grinder 130 relative to a second reference element 152. Grinder 130 may thus be adjustable relative to base 102 in at least two dimensions via actuators 138 and 132, allowing a position of grinding element 140 to be varied for grinding a workpiece such as valve member 40. Additional actuators (not shown) might be provided for additional control of a position of grinder 130 in other embodiments.

As mentioned above, valve member 40 is shown at one stage of remanufacturing according to the present disclosure. The stage depicted in FIG. 2 may be understood as part of a set-up stage for setting up grinding apparatus 100 for grinding valve member 40. Setting up grinding apparatus 100 may commence by engaging chuck 104 with valve member 40 by seating first end 48 in chuck 104. Steady rest 110 may then be brought into contact with end portion 56. Axis A is defined by end portion 56 and comprises a center axis of a cylinder defined by end portion 56. Seating surfaces 44 and 46 will typically each be centered about axis A, or are as close as practicable to being centered about axis A when originally formed on valve member 40, such as by grinding.

A second axis B is also shown in FIG. 2 and is defined by grinding apparatus 100. In the illustrated embodiment, axis B is a line which connects an axis of rotation of chuck 104 and a center axis defined by elements 116, neither of which are shown in FIG. 2 for purposes of clarity. In particular, axis B intersects an axis of rotation of chuck 104 at a point Y, which lies at a middle of a contact length of chuck jaws 106 with end portion 52. Axis B intersects a center axis defined by elements 116 at a point X, which lies at a middle of a contact length of elements 116 with end portion 56.

When valve member 40 is first positioned in grinding apparatus 100 axes A and B may be non-congruous. Axis A and axis B may be considered to be non-congruous where they are non-parallel, laterally offset from one another, or both. Moreover, each time chuck 104 and steady rest 110 are first engaged with a workpiece to be ground, the relative positioning of components of grinding apparatus 100 may be different. There also may be relatively minute differences in the force exerted by actuators 108 and 118 and/or variation in other factors such as ambient temperature. These and other variables are believed to cause the position of an axis defined by grinding apparatus 100, such as axis B, to potentially vary each time a workpiece is positioned therein.

Where axis A and axis B are non-congruous, as shown in FIG. 2, it may be difficult or impossible to hold tolerances for grinding surfaces 44 and 46 to specifications. For instance, if axis B is offset or non-parallel relative to axis A, then valve member 40 may not rotate smoothly during grinding, but instead might vibrate, or move in an orbital pattern. Locating of grinder 130 may also be inaccurate where axes A and B are non-congruous, as an assumed relative location/orientation of valve member 40 may differ from its actual location/orientation. Although non-congruity between axes A and B may not even be perceptible to an observer, deviations from acceptable tolerances for grinding valve member 40 may occur if the non-congruity is not addressed. It should be appreciated that axis B is shown herein for illustrative purposes only. The non-congruous relationship described herein might be between axis A and another axis defined by grinding apparatus 100, such as the axis of rotation of chuck 104, or a center axis defined by steady rest 110 or still another axis.

Setting up grinding apparatus 100 for regrinding valve member 40 as described herein can establish congruity between axis A and axis B prior to regrinding seating surfaces 44 and 46. This can allow rotation of valve member 40 to be smoother and/or ensure that components of grinding apparatus 100 can be accurately located relative to surfaces 44 and 46. For example, grinder 130 may be located for regrinding surfaces 44 and 46 via reference elements 150 and 152, based on their presumed locations relative to valve component 40. If reference elements 150 and 152 are not in fact located as presumed relative to valve component 40, for example because axes A and B are non-congruous, then grinding element 140 may not accurately locate for regrinding surfaces 44 and 46. In the case of valve member 40, a roundness parameter for one or both of seating surfaces 44 and 46, run-out of surfaces 44 and 46 relative to axis A, and a longitudinal distance between surfaces 44 and 46 may be relatively tightly specified. In other words, in regrinding surfaces 44 and 46 acceptable tolerances for roundness, run-out and longitudinal distance may be relatively small.

As mentioned above, valve member 40 is shown in grinding apparatus 100 in FIG. 2 as it might appear during setting up grinding apparatus 100 for regrinding valve member 40. Valve member 40 has been positioned in chuck 104, and a chucking pressure of chuck 104 has been increased to a chucking pressure great enough to support valve member 40 for rotation without slipping. Steady rest 110 has been engaged with end portion 56 such that elements 116 contact outer diameter 42 on end portion 56. As also mentioned above, setting up grinding apparatus 100 may include establishing congruity between axis A and axis B. Establishing congruity may include rotating valve member 40 in grinding apparatus 100 in the configuration shown in FIG. 2.

Figure 3:
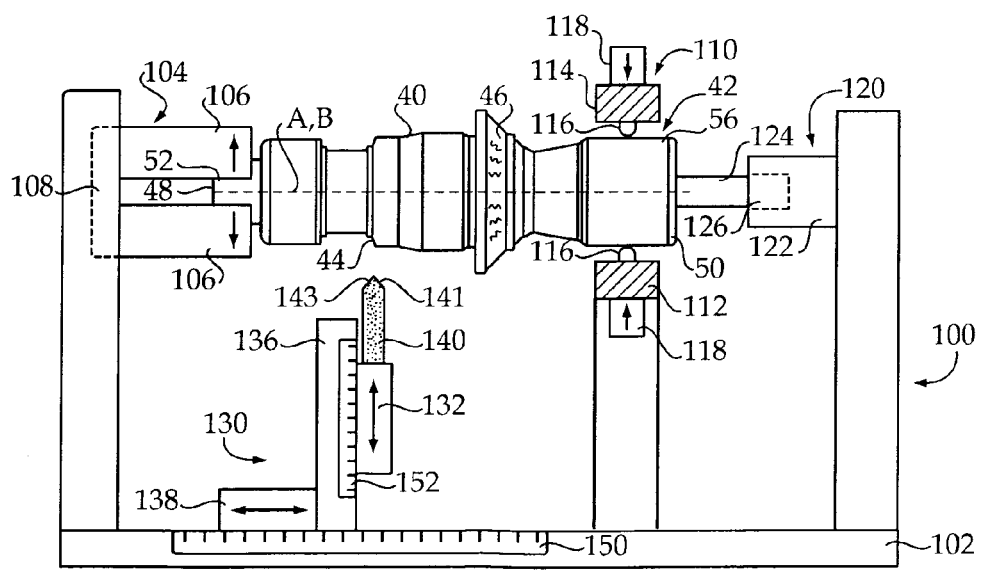
FIG. 3 is a side diagrammatic view of a machine component positioned in a grinding apparatus at another remanufacturing stage, according to one embodiment.

Following rotating valve member 40, rotation of valve member 40 may be ceased. Turning to FIG. 3, a chucking pressure of chuck 104 may then be reduced, and actuator 126 may be activated to engage pusher 124 against end 50 of valve member 40. Contacting end 50 with pusher 124 can reseat end portion 52 of valve member 40 in chuck 104. Steady rest 110 may remain in contact with end portion 56. After contacting pusher 124 with end 50, actuator 126 may be reversed to bring pusher 124 out of contact with end 50. Chucking pressure of chuck 104 may be again increased, up to a chucking pressure great enough to support valve member 40 for rotation and regrinding without slipping. The chucking pressure applied after contacting pusher 124 with valve member 40 may be the same chucking pressure applied prior to rotating valve member 40.

The foregoing sequence of actions establishes congruity between axis A and axis B. In other words, any relative offset between axis A and axis B and/or any non-parallelism between axis A and axis B is reduced or eliminated, and valve member 40 is ready to be reground. Thus, axis A and axis B are shown in FIG. 3 as coextensive. Establishing congruity is believed to result at least in part from a reduction in any deviation of steady rest 110 and chuck 104 from a common axis and/or proper seating of valve member 40 in chuck 104. It will be recalled that when valve member 40 is first placed in grinding apparatus 100, axis B and axis A may have varying degrees of non-parallelism and relative offset between them. Setting up grinding apparatus 100 as described herein reduces or eliminates any offset and/or non-parallelism between axis A and axis B via what is believed to be a self-centering action of chuck 104 and steady rest 110 during rotating valve member 40, and/or reseating end portion 52.

Figure 4:
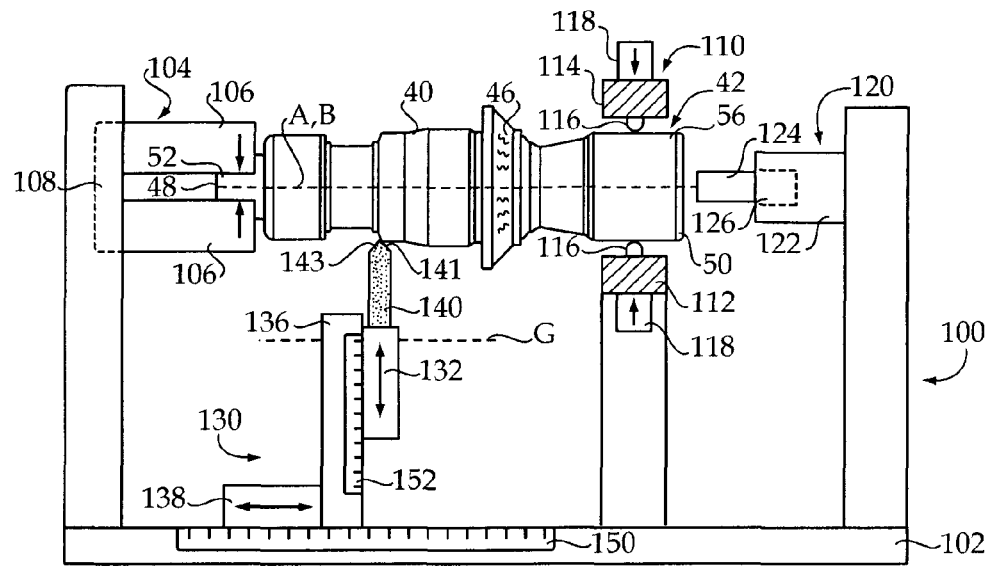
FIG. 4 is a side diagrammatic view of a machine component positioned in a grinding apparatus at yet another remanufacturing stage, according to one embodiment.

Turning now to FIG. 4, there is shown valve member 40 supported in grinding apparatus 100 as it might appear upon initiating a regrinding stage of remanufacturing. Pusher 124 has been moved out of contact with end 50, chuck 104 is engaged with end portion 52, and steady rest 110 contacts end portion 56. Grinder 130 has also been positioned such that first face 141 of grinding element 140 contacts seating surface 44.

Figure 5:
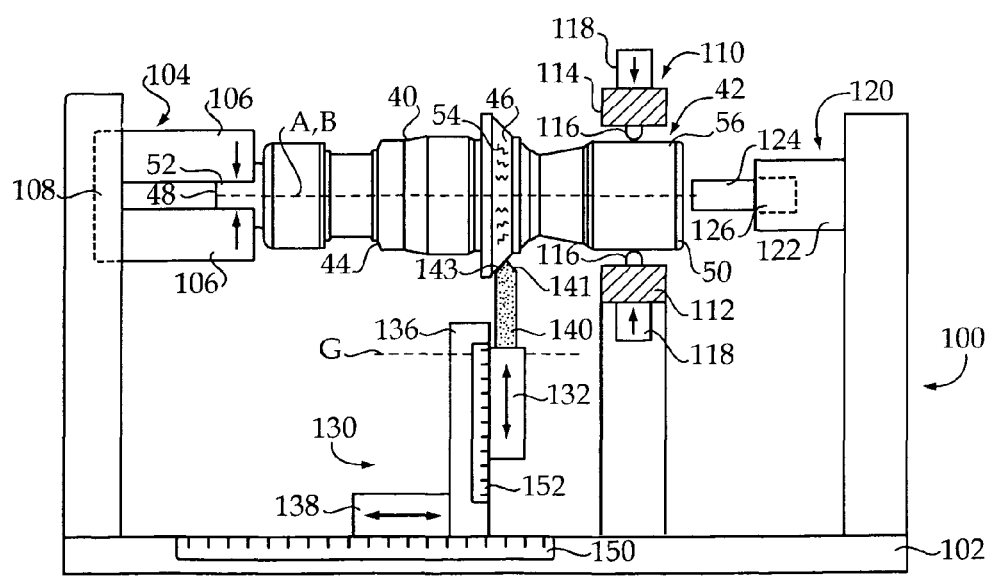
FIG. 5 is a side diagrammatic view of a machine component positioned in a grinding apparatus at yet another remanufacturing stage, according to one embodiment.

Regrinding may commence by rotating grinding element 140 to regrind seating surface 44 while simultaneously rotating valve member 40. Following regrinding of surface 44, actuators 138 and 132 may be used to disengage grinding element 140 from valve member 40, then reposition grinding element 140 for regrinding seating surface 46. Turning now to FIG. 5, there is shown valve member 40 supported in grinding apparatus 100 as it might appear after completing regrinding of seating surface 44, and upon repositioning grinding apparatus 100 for regrinding seating surface 46. Grinding face 143 of grinding element 140 contacts surface 46. Regrinding of surface 46, which removes wear regions 54, may commence by rotating grinding element 140 and simultaneously rotating valve member 40, similar to regrinding of surface 44. Once regrinding of surface 46 is completed, valve member 40 may be removed from grinding apparatus 40, inspected if necessary, then reassembled with other components of a hydraulically actuated device such as a fuel injector and returned to service therein.

INDUSTRIAL APPLICABILITY

The present disclosure sets forth a recipe for setting up grinding apparatus 100 in preparation for regrinding valve member 40 which ensures that relatively tight tolerances may be achieved. These actions may be carried out while valve member 40 is mounted in a single grinding apparatus, allowing the procedure to be relatively fast. A single chucking and single grinding element may be used, allowing the entire remanufacturing process to take place in one computer-controlled cell on a factory floor. Remanufacturing engineers have for many years sought viable strategies for remanufacturing certain valve components in a production environment. Valve member specifications may be relatively exacting, particular in the context of high-speed, short-travel distance poppet valves and the like used in fuel injectors. Accordingly, even seemingly small deviations from specified tolerances can affect performance and/or reliability of a hydraulically actuated device such as a fuel injector. In the case of earlier poppet valve remanufacturing strategies, problems relating to run out of valve seating surfaces relative to a valve's longitudinal axis, roundness and distances between valve seating surfaces inevitably emerged. For these and other reasons, attempts at remanufacturing poppet valves have heretofore failed.

The present disclosure addresses all of these issues, enabling relatively rapid processing of valve members for remanufacturing without sacrificing quality. The high grinding precision and accuracy made possible in view of the teachings herein is believed to result at least in part from the described set-up procedure which removes uncertainties and inaccuracies in the grinding process. The manner in which regrinding takes place is also believed to minimize the risk that problems or deviations will develop during regrinding. For example, it may be noted that with the exception of steady rest 1 10, against which valve member 40 is free to rotate, chuck 104 is the only supporting or fixturing component of grinding apparatus 100 which contacts valve member 40. This contrasts with many other grinding apparatuses where chucks or other fixturing devices are engaged with both ends of a component to be ground. The potential for misalignment between two chucks, as in certain earlier strategies, tends to be difficult to rectify prior to grinding, and is also considered to provide more opportunity for run-out and similar problems to develop during a grinding process than where only one end of a valve member is chucked, in certain instances. This may be particularly the case where one end of a valve member comprises a guide surface for guiding valve movement, as in valve member 40, and defines axis A about which surfaces 44 and 46 are to be centered.

While remanufacturing of valve members is considered to be one practical implementation of the present disclosure, it is not thereby limited. Other elongate valve components or other machine components might be remanufactured as described herein. It should further be appreciated that the present disclosure is not limited in application to valve components, nor even to the field of remanufacturing. Other elongate machine components may be advantageously ground according to the teachings set forth herein, as the improvements in both precision and accuracy are applicable outside of the presently described context.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

We claim:

1. A method of remanufacturing an elongate valve component of a hydraulically actuated device comprising:
   receiving an elongate valve component removed from service in a hydraulically actuated device;
   setting up a grinding apparatus for regrinding the valve component, including seating one end of the valve component in a chuck of the grinding apparatus and clamping the chuck about the one end, then contacting a rolling element of a steady rest of the grinding apparatus with the valve component at a contact location while rotating the valve component in the chuck, such that the valve component is rotatably supported by the rolling element and rotates relative to the steady rest, and then reseating the one end of the valve component in the chuck; and
   subsequent to setting up the grinding apparatus for regrinding the valve component, regrinding a first surface and then a second surface of the valve component each positioned between the one end and the contact location, while contacting the rolling element with the valve component at the contact location, and such that the valve component is rotatably supported by the rolling element and rotates relative to the steady rest.

2. The method of claim 1 wherein setting up the grinding apparatus for regrinding the valve component comprises establishing congruity between a first axis defined by the valve component and a second axis defined by the grinding apparatus.

3. The method of claim 2 wherein the valve component comprises a control valve member, the method further comprising inhibiting run-out of the first and second surfaces relative to the first axis at least in part by establishing congruity between the first axis and the second axis.

4. The method of claim 3 wherein setting up the grinding apparatus comprises contacting the rolling element with a guide surface of the valve component adjoining a second end of the valve component opposite the one end.

5. The method of claim 4 wherein regrinding the first surface comprises regrinding a first seating surface disposed at a first location relative to the guide surface, and wherein regrinding the second surface comprises regrinding a second seating surface disposed at a second location relative to the guide surface which is spaced from the first location.

6. The method of claim 5 wherein:
setting up the grinding apparatus comprises increasing a chuck pressure on the one end of the valve component; and
reseating the one end of the valve component comprises decreasing the chuck pressure, then contacting a pusher with the second end of the valve component, and then again increasing the chuck pressure.

7. The method of claim 6 wherein regrinding the first surface comprises regrinding the first surface with a first grinding face of a grinding element, and wherein regrinding the second surface comprises regrinding the second surface with a second grinding face of the grinding element opposite the first grinding face.

8. The method of claim 1 wherein receiving an elongate valve component comprises receiving a poppet valve member removed from service in a valve body of a fuel injector, the method further comprising reassembling the valve component with a valve body of a fuel injector for service therein.

9. A process for grinding elongate machine components comprising:
engaging a chuck of a grinding apparatus with an elongate machine component, including seating one end of the machine component in the chuck and clamping the chuck about the one end;
contacting a rolling element of a steady rest of the grinding apparatus with the machine component at a contact location subsequent to the engaging of the chuck, the machine component defining a first axis and the grinding apparatus defining a second axis;
grinding a first and a second surface on an outer diameter of the machine component each positioned between the one end and the contact location, while contacting the rolling element with the machine component at the contact location, and such that the machine component is rotatably supported by the rolling element and rotates relative to the steady rest; and
prior to grinding the first and second surfaces, establishing congruity between the first axis and the second axis by rotating the machine component while contacted with the rolling element at the contact location, and such that the machine component is rotatably supported by the rolling element and rotates relative to the steady rest, then reseating the one end of the machine component in the chuck.

10. The process of claim 9 wherein the elongate machine component comprises a valve member, and wherein grinding a first surface and grinding a second surface comprise grinding a first seating surface, then grinding a second seating surface, respectively, of the valve member.

11. The process of claim 10 wherein contacting the rolling element comprises contacting the rolling element with a guide surface of the valve member adjoining a second end opposite the one end, and further comprising inhibiting runout of the first and second seating surfaces relative to the first axis at least in part by establishing congruity between the first axis and the second axis.

12. The process of claim 11 comprising remanufacturing the valve member, wherein grinding the first seating surface and grinding the second seating surface comprise regrinding the seating surfaces to remove wear thereon.

* * * * *